US008982511B2

(12) United States Patent
Biskeborn et al.

(10) Patent No.: US 8,982,511 B2
(45) Date of Patent: Mar. 17, 2015

(54) DRIVE FOR ACCEPTING HYBRID TAPE HEAD ASSEMBLY

(75) Inventors: Robert G. Biskeborn, Hollister, CA (US); Philipp Herget, San Jose, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/107,795

(22) Filed: May 13, 2011

(65) Prior Publication Data

US 2012/0287527 A1     Nov. 15, 2012

(51) Int. Cl.
*G11B 5/50* (2006.01)
*G11B 5/56* (2006.01)

(52) U.S. Cl.
CPC ......................................... *G11B 5/50* (2013.01)
USPC .......................................... 360/241; 360/291

(58) Field of Classification Search
CPC ........................................................ G11B 5/50
USPC ........................... 360/250, 251.1–251.5, 261, 360/261.1–261.3, 271, 271.1–271.9, 272, 360/281, 280.1–281.9, 282, 291, 360/291.1–291.9, 292, 241, 241.1–241.3, 360/130.21–130.24, 130.31–130.33, 129, 360/281.1–281.9
See application file for complete search history.

(56) References Cited

U.S. PATENT DOCUMENTS

| | | | |
|---|---|---|---|
| 4,158,868 A * | 6/1979 | Jenkins | 360/291.3 |
| 4,184,183 A | 1/1980 | Dolby | |
| 4,598,287 A * | 7/1986 | Osakabe et al. | 340/12.31 |
| 5,038,241 A * | 8/1991 | Ohuchi | 360/291.6 |
| 5,444,588 A * | 8/1995 | Choi | 360/241 |
| 5,862,014 A * | 1/1999 | Nute | 360/291 |
| 6,704,169 B2 * | 3/2004 | Nawa | 360/261.3 |
| 7,175,129 B2 | 2/2007 | Rudi | |
| 7,414,811 B2 | 8/2008 | Biskeborn | |
| 7,570,450 B2 | 8/2009 | Koeppe | |
| 2006/0010285 A1 | 1/2006 | Georgis | |
| 2007/0285838 A1 | 12/2007 | Hennecken et al. | |
| 2008/0049358 A1 | 2/2008 | Biskeborn et al. | |
| 2009/0213493 A1 | 8/2009 | Bui et al. | |

FOREIGN PATENT DOCUMENTS

JP       55125529 A  *  9/1980  ............ G11B 5/50
WO   WO 2009036189 A1 *  3/2009  ............ G11B 15/62

* cited by examiner

*Primary Examiner* — Craig A. Renner
(74) *Attorney, Agent, or Firm* — Zilka-Kotab, PC

(57) ABSTRACT

A head assembly according to one embodiment includes at least one module having magnetic transducers for reading and/or writing to a magnetic tape; electronics electrically coupled to the transducers, the electronics comprising at least one of amplifiers; bias circuitry; write drivers; write resistors; a memory device; and a chip with at least one of identification information about the head assembly, customization data, and firmware; and a connector for detachably interfacing to a drive having a head region for receiving the head assembly. A magnetic tape drive according to one embodiment includes a head region for removably receiving a head assembly; a mechanical interface to facilitate alignment of the head assembly when inserted in the head region; and a connector for detachably interfacing with the head assembly. Additional systems and methods are also presented.

17 Claims, 9 Drawing Sheets

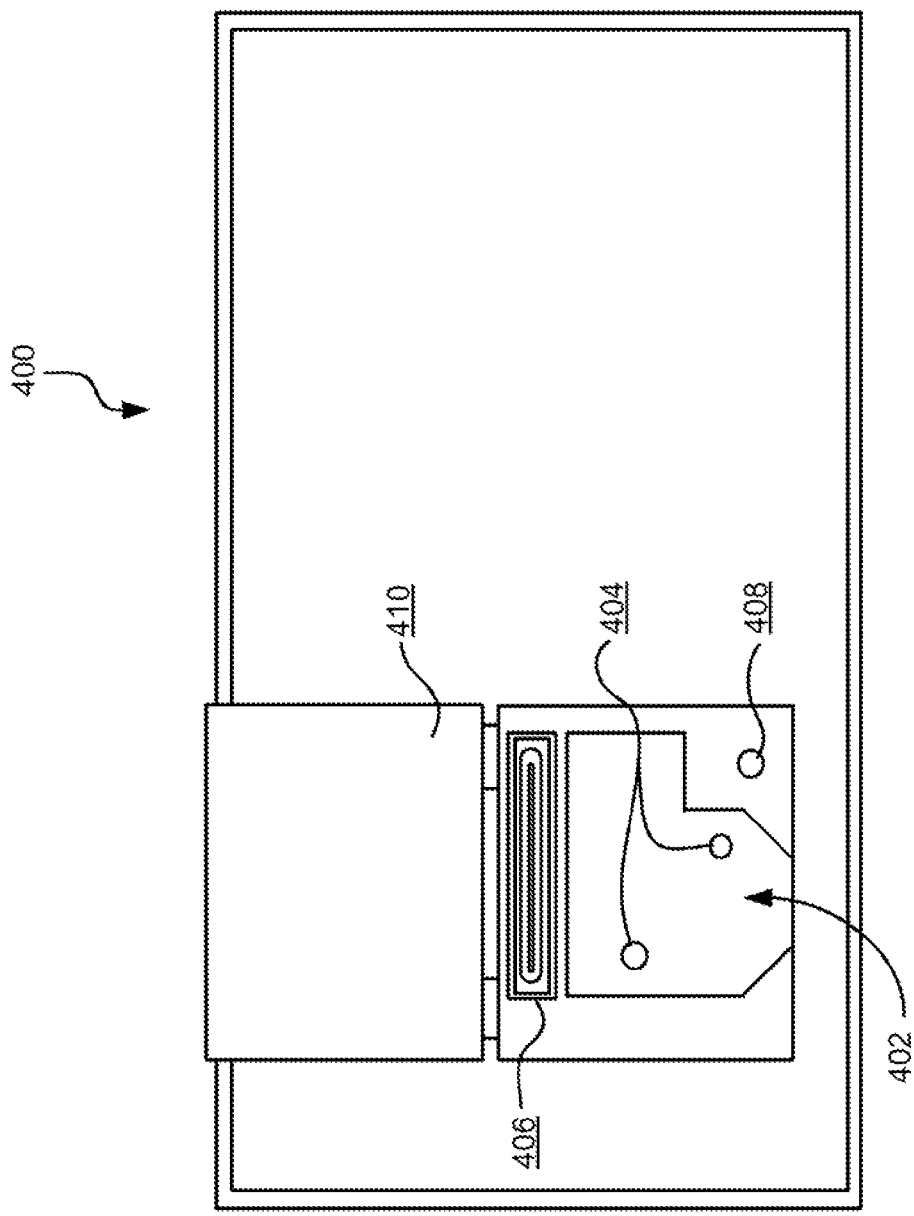
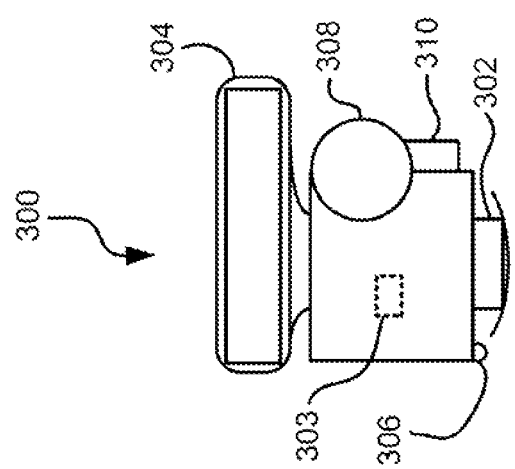

DRIVE FOR ACCEPTING HYBRID TAPE HEAD ASSEMBLY

BACKGROUND

The present invention relates to data storage systems, and more particularly, this invention relates to tape-based storage systems and components thereof.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium.

BRIEF SUMMARY

A head assembly according to one embodiment includes at least one module having magnetic transducers for reading and/or writing to a magnetic tape; electronics electrically coupled to the transducers, the electronics comprising at least one of amplifiers; bias circuitry; write drivers; write resistors; a memory device; and a chip with at least one of identification information about the head assembly, customization data, and firmware; and a connector for detachably interfacing to a drive having a head region for receiving the head assembly.

A magnetic tape drive according to one embodiment includes a head region for removably receiving a head assembly; a mechanical interface to facilitate alignment of the head assembly when inserted in the head region; and a connector for detachably interfacing with the head assembly.

A magnetic tape drive system according to one embodiment includes a drive having a head region for removably receiving a head assembly and a first connector for detachably interfacing with the head assembly; the head assembly in the head region, the head assembly having electronics electrically coupled to transducers thereof, the electronics comprising at least one of amplifiers; bias circuitry; write drivers; write resistors; a memory device; and a chip with at least one of identification information about the head assembly, customization data, and firmware; the head assembly having a second connector coupled to the electronics, the second connector being detachably coupled to the first connector; and a mechanical interface between the drive and the head assembly to facilitate alignment of the head assembly relative to the drive.

A method according to yet another embodiment includes inserting a head assembly in a head region of a magnetic tape drive, the head assembly having one or more modules containing a plurality magnetic transducers and one of amplifiers, write drives, or bias circuitry; wherein upon receiving the head assembly the drive is at least one of a functional drive, an updated drive, and a legacy drive.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 illustrates a side view of a head assembly according to one embodiment.

FIG. 4 illustrates a side view of a magnetic tape drive according to one embodiment.

DETAILED DESCRIPTION

Figure 1:
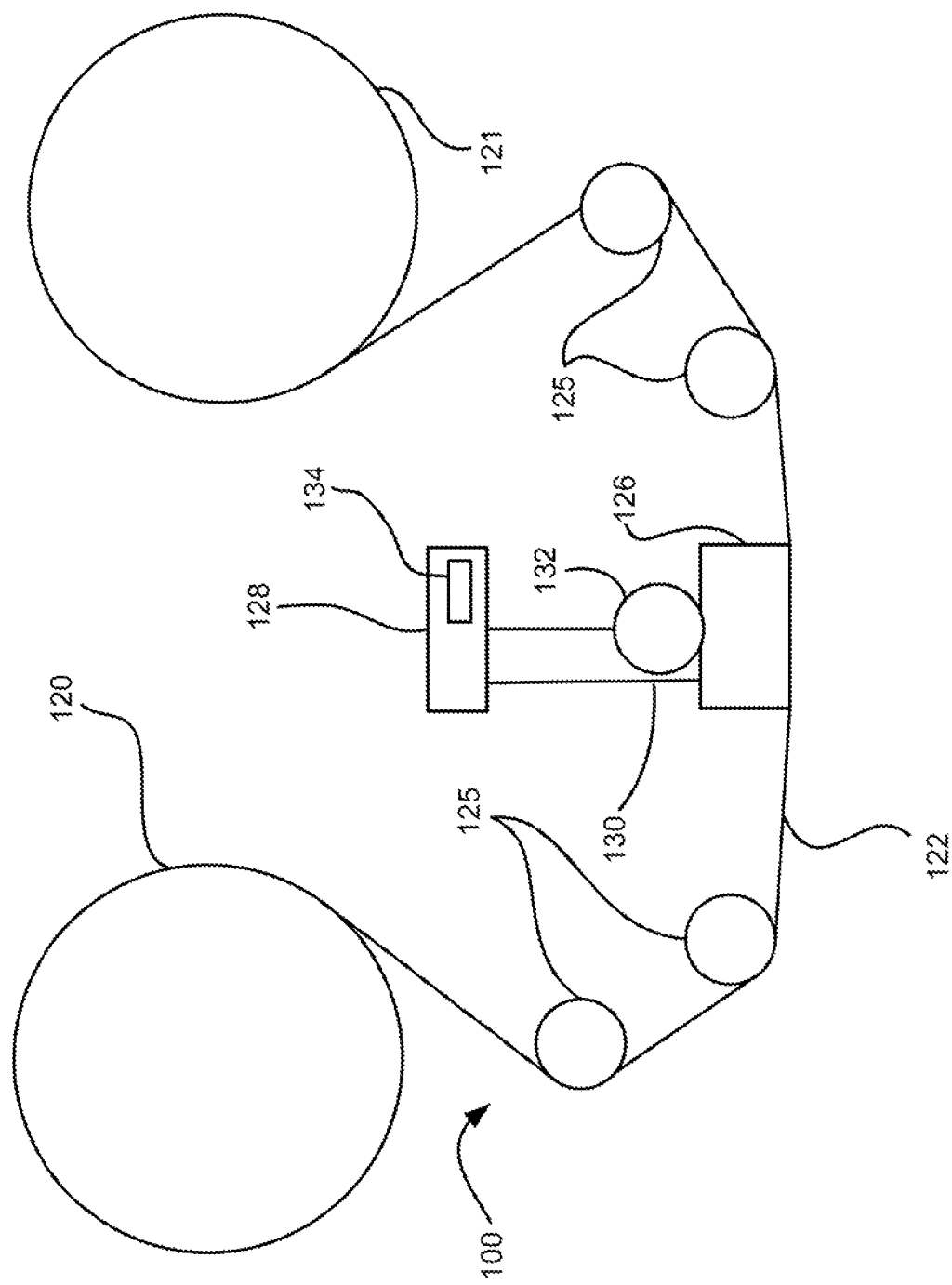
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a head assembly includes at least one module having magnetic transducers for reading and/or writing to a magnetic tape; electronics electrically coupled to the transducers, the electronics comprising at least one of amplifiers; bias circuitry; write drivers; write resistors; a memory device; and a chip with at least one of identification information about the head assembly, customization data, and firmware; and a connector for detachably interfacing to a drive having a head region for receiving the head assembly.

In another general embodiment, a magnetic tape drive includes a head region for removably receiving a head assembly; a mechanical interface to facilitate alignment of the head assembly when inserted in the head region; a connector for detachably interfacing with the head assembly; and circuitry configured to operate with electronics on the head assembly, the electronics on the head assembly comprising at least one of amplifiers; bias circuitry; write drivers; write resistors; a memory device; and a chip with at least one of identification information about the head assembly, customization data, and firmware.

In another general embodiment, a magnetic tape drive system includes a drive having a head region for removably receiving a head assembly and a first connector for detachably interfacing with the head assembly; the head assembly in the head region, the head assembly having electronics electrically coupled to transducers thereof, the electronics comprising at least one of amplifiers; bias circuitry; write drivers; write resistors; a memory device; and a chip with at least one of identification information about the head assembly, customization data, and firmware; the head assembly having a second connector coupled to the electronics, the second connector being detachably coupled to the first connector; and a mechanical interface between the drive and the head assembly to facilitate alignment of the head assembly relative to the drive.

In another general embodiment, a method according to yet another embodiment includes inserting a head assembly in a head region of a magnetic tape drive, the head assembly having one or more modules containing a plurality magnetic transducers and one of amplifiers, write drives, or bias circuitry; wherein upon receiving the head assembly the drive is at least one of a functional drive, an updated drive, and a legacy drive.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
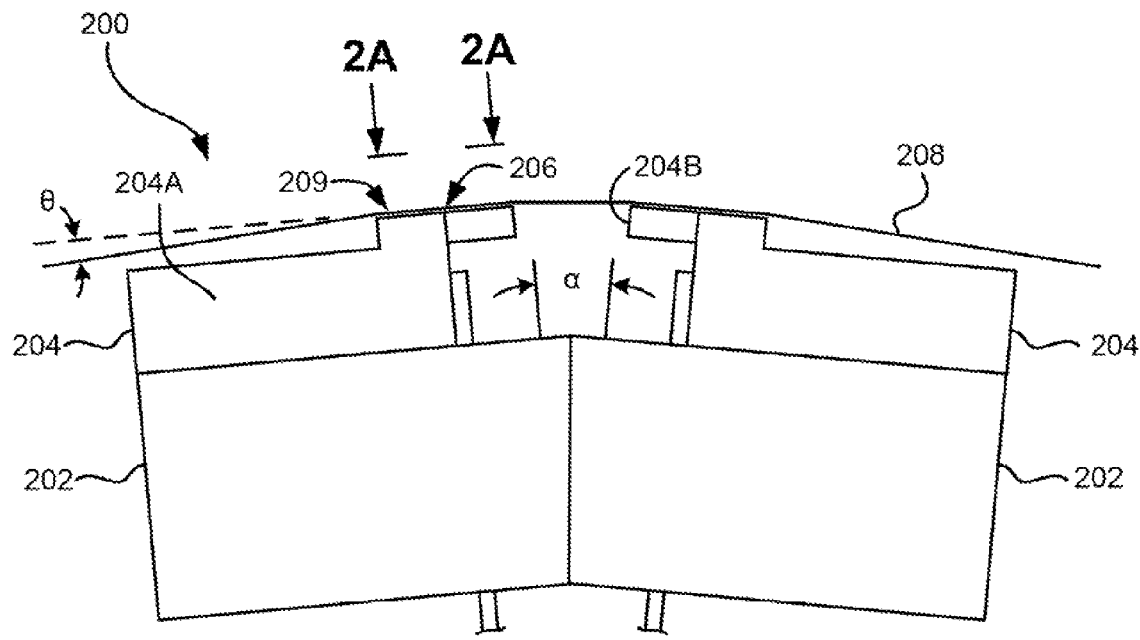
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading servo data on the medium.

Figure 2A:
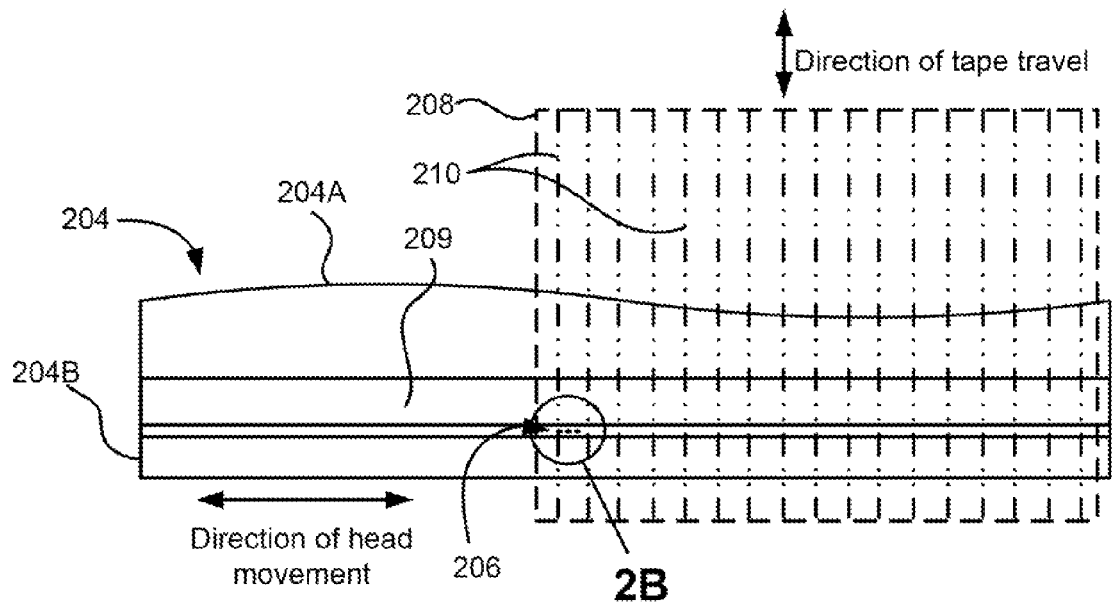
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
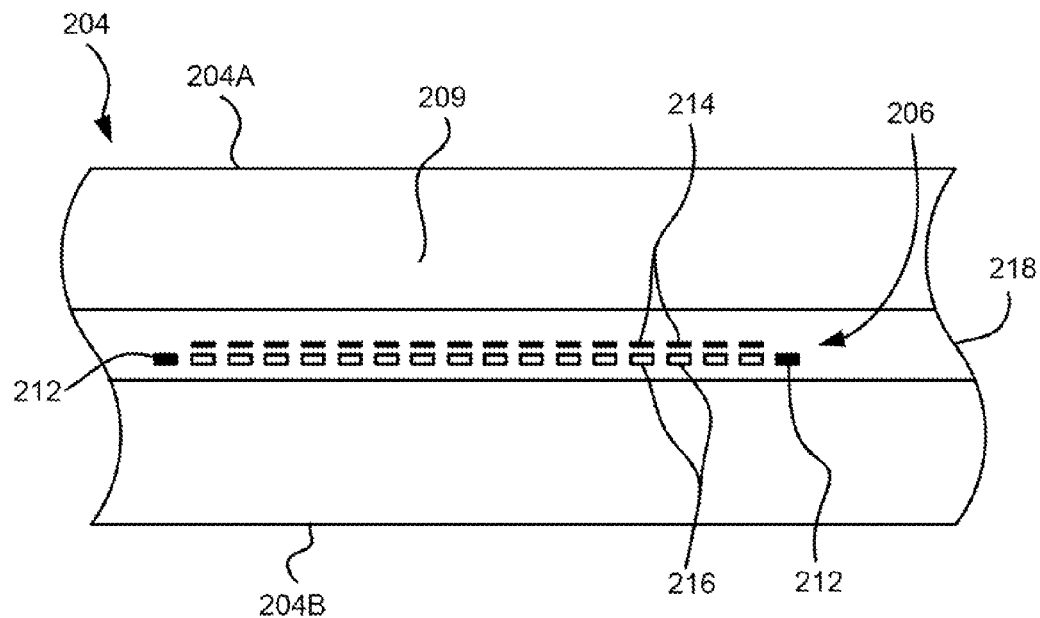
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
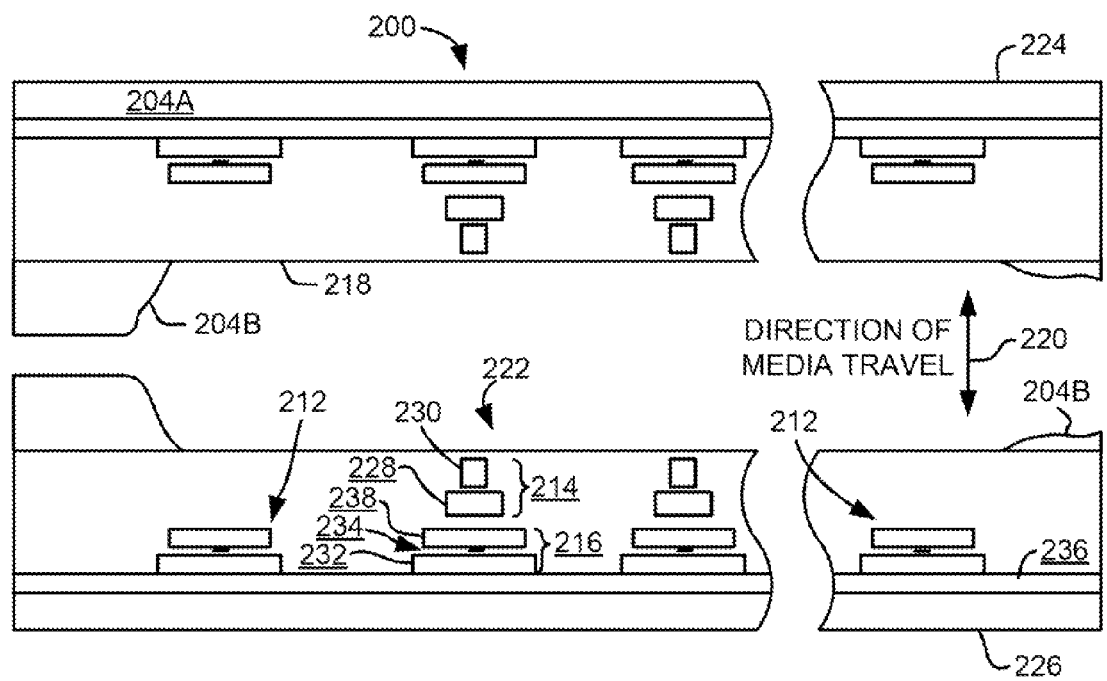
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

FIG. 3 depicts a head assembly 300 that is easily connected to and disconnected from a drive, such as the drive 400 shown in FIG. 4. With continued reference to FIG. 3, the head assembly in various embodiments includes at least one module 302 having magnetic transducers for reading and/or writing to a magnetic tape. One embodiment has one module. Another embodiment has two modules. Yet another embodiment has more than two modules, such as three, four, or more. The modules may be similar to those as shown in FIGS. 2A-2C, and/or have any other design including those known in the art.

Electronics 303 in the head assembly are electrically coupled to the transducers, the electronics comprising at least one of amplifiers (e.g., for data and/or servo channels), bias circuitry (e.g., bias resistors for setting the range of the bias current), write drivers (e.g., at least one write driver chip that creates the currents that drive the writers in the various channels), and write resistors. The electronics may be of a type known in the art. Appropriate power delivery circuitry may also be present to provide power to the various electronics.

In one approach, the electronics may be components that would typically be found on the circuit board of a modern tape drive of a type having a head assembly having magnetic recording modules only. By integrating electronics with the head assembly, the electronics that are particularly tailored to the head assembly are on-board components. Such a head assembly may be used as an interchangeable component for appropriately configured generalized platforms.

In some approaches, the same circuit board of the tape drive may be usable with multiple types of head assemblies, perhaps with installation of appropriate microcode on the tape drive to function with the new head assembly. In a particularly preferred approach, some or all of the electronics that are specifically configured to work with a particular set of transducers are present on the head assembly rather than the circuit board of the tape drive.

Preferably, the electronics are fixedly coupled to, e.g., soldered to, formed on or in, etc. a same substrate to which the at least one module is coupled. In one approach, the electronics are positioned proximate to the at least one module. For example, the electronics may be formed directly on the module(s), adhesively coupled thereto, or simply attached to the same substrate as the at least one module. The electronics may be designed to match the performance characteristics of the head assembly. Placing the electronics on the head assembly enables design flexibility and improved signal characteristics.

In one approach, the electronics of the head assembly may include multiplexers for switching between multiple sets of readers and/or writers. In another approach, the electronics may be and/or include a chip with at least one of identification information about the head assembly, customization data, and firmware. In a further approach, the electronics are capable of wireless communication with a drive. In one approach, the electronics may include a radio frequency identification device that can be read by a magnetic tape drive once the at least one module is mated therewith.

In one embodiment, some or all of the individual components comprising the electronics are on a printed circuit board (PCB) and connected to the transducers via any suitable mechanism, such as a cable, wire bonding, leads in the substrate of the transducers, etc. One illustrative embodiment includes a flexible printed circuit (FPC) that may be connected to the read/write elements using wire bonding. In general, any conventional configuration for attaching the electronics to the head may be used, as would be known to one skilled in the art. This may be accomplished with a connector on the PCB using, for example, a paddle connecter, zero insertion force (ZIF) connector, or header. It may also be accomplished using, at least in part, a flexible circuit such as an additional cable and/or the existing cable.

In another embodiment, the individual electronic components comprising the electronics may be attached to one or more FPCs directly. The FPC may be attached to the one or more modules of the head and may also include a mechanism for connecting to the electronics of a magnetic tape drive.

The head assembly also includes a connector 304, as shown in FIG. 3, for interfacing the head assembly to a drive 400 having a head region 402, as depicted in FIG. 4, for accommodating the head assembly. In general, any conventional configuration for attaching the head assembly to the tape drive may be used, as would be known to one skilled in the art. This may be accomplished with a connector on the head assembly, for example, a paddle connecter, ZIF connector, or header. It may also be accomplished using, at least in part, a flexible circuit such as an additional cable and/or the existing cable.

The head assembly may have many other components as well. For example, a head assembly in one embodiment includes mechanical tape guiding components 306, such as rollers, guides, etc. In another approach, the head assembly does not have any tape guiding components; rather the magnetic tape drive has such components.

In another embodiment, the head assembly has at least one actuator 308 (e.g., a coarse and/or fine actuator) for adjusting the position of the transducers relative to the head assembly, and thus relative to a tape during reading and writing.

In yet another embodiment, the head assembly includes a skew adjustment mechanism 310. Various types of skew adjustments that may be applied include setting an initial or operating skew of the transducers, configuring the transducers to follow tape skew, using skew adjustments to reduce the apparent transducer pitch relative to the tape, etc. The skew adjustment mechanism may be self-contained on the head assembly, or may include a skew adjustment mechanism that couples to a skew adjustment mechanism on the drive. In either case, the skew control may be designated by the drive via electronic signals, mechanical functions, or both.

With reference to FIG. 4, the magnetic tape drive 400 according to one embodiment includes the head region 402 for removably receiving a head assembly such as that of FIG. 3.

Referring again to FIG. 4, the magnetic tape drive may include a mechanical interface 404 to facilitate alignment of the head assembly when inserted in the head region. The mechanical interface may be specified by a standard, thereby enabling interchangeability of head assemblies from various vendors with the magnetic tape drive, and conversely, enabling usability of one head assembly with magnetic tape drives from various vendors.

A connector 406 is provided for detachably interfacing with the connector of the head assembly. Any type of connector configuration known in the art may be used. Examples include plug and socket connectors, compression connectors, serial bus connectors, etc. The connector may be coupled to a circuit board of the magnetic tape drive.

Electronics may be coupled to the connector 406, the electronics being for communicating with one or more of amplifiers, bias circuitry, write drivers, write resistors, memory device, chip, etc. on the head assembly. The electronics of the magnetic tape drive may include circuitry configured to operate with electronics on the head assembly, such as those listed above.

The magnetic tape drive may have many other components as well. For example, as alluded to above, the magnetic tape drive may include a skewing actuator 408 for interfacing with the head assembly. In another approach, the tape drive has a door 410, e.g., hatch or other provision, for enabling insertion of the head assembly into the head region.

Figure 5A:
FIGS. 5A-5D depict datums for aligning the head assembly relative to the magnetic tape drive.
Figure 5B:
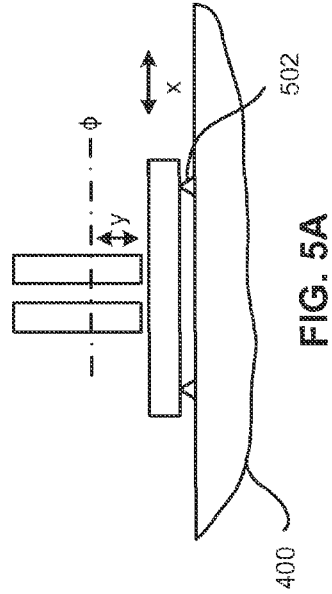
Figure 5C:
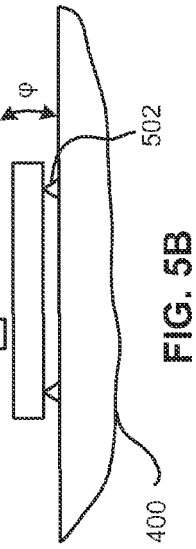

Referring to FIGS. 5A-5C, the head assembly 300 and/or magnetic tape drive 400 may have one or more datums 502 for establishing a location of tape bearing surface and the transducers relative to the head assembly and/or magnetic tape drive. Thus, datums may be provided in the head assembly itself for positioning the module(s) relative to the frame of the head assembly. The locations of the datums are preferably precisely established relative to the locations of the tape bearing surfaces and transducers. Datums may also or alternatively be present on the head assembly and/or tape drive to enhance proper positioning of the head assembly relative to the magnetic tape drive. For example, the mechanical interface of the magnetic tape drive may have one or more datums for aligning the head assembly relative to the head region.

Any type of datum known in the art may be used. Illustrative datums include precision fabricated surfaces that, when engaging another surface, provide a precise locational positioning.

In some approaches, the datums may include one or more members extending from the head assembly, the magnetic tape drive, or both; optionally receiving apertures, depressions or channels that complement the members; screws; tongue and groove arrangements; slides; etc.

The datums, in some approaches, may accommodate up to and including the at least 6 degrees of freedom associated with positioning the tape bearing surfaces and transducers. Moreover, some datums may provide a constraint in one direction but allow a measure of movement in another direction. For example, a first pin datum may constrain movement of a portion of the head assembly in the x and y directions, while a second pin datum engages a channel in the head assembly to allow some measure of movement such as movement in the z direction, or rotation around the first pin datum.

In one embodiment the head assembly includes tape guides, wherein the locations of the guides are precisely set relative to the location of the tape bearing surfaces and transducers. In this embodiment the datums may position the guide positions.

To facilitate the foregoing, mechanical datums provided on the head assembly may engage datums in the drive, allowing for precise alignment of the head relative to the other tape path components present in the drive.

Figure 5D:
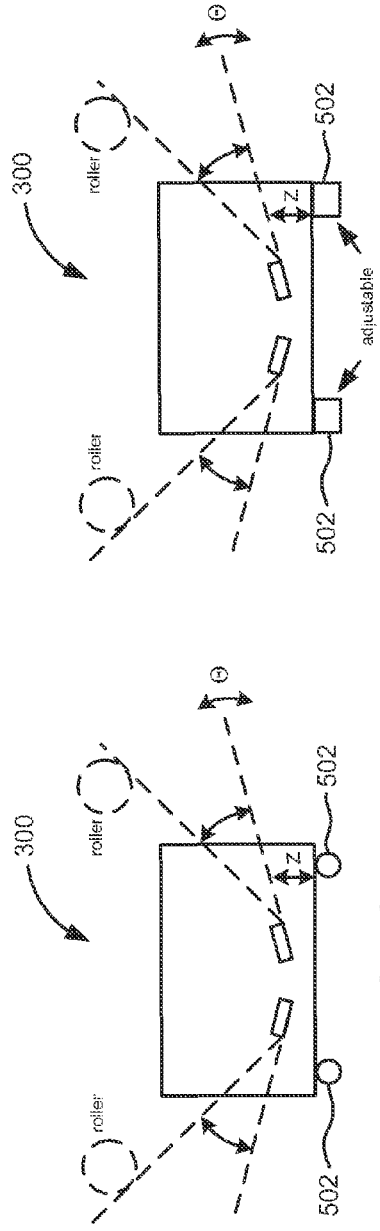

In one approach, at least some of the datums 502 are adjustable. See FIG. 5D. This configuration allows adjustments to be made in the field, as needed.

In another approach, at least some of the datums are fixed.

The magnetic tape drive may be is upgraded or downgraded when the head assembly is inserted therein. Similarly, the drive may be simply repaired if the same type of head assembly is inserted therein.

In some embodiments, the drive may receive an upgraded head assembly having a higher performance. The higher performance head may read and write at a higher capacity, higher linear density, higher track density, later tape format, etc. It may also have a better signal to noise ratio due to advances in the readers and/or electronics.

In yet another embodiment, the magnetic tape drive accepts a head assembly that may additionally contain a memory device containing information pertaining to the head assembly. This information may include performance characteristics of the read/write elements. When inserted into the drive, these characteristics may be used to optimize the performance of the now-assembled magnetic tape drive. The characteristics may also be used by the drive to enable upgrading the performance of the drive when an upgraded head is inserted. The memory device may also contain machine instructions, or drive microcode which can be used by the drive to update the algorithms used to read and write data, move the tape, servo the head, etc.

In another embodiment, the memory device may be used by the drive to store data pertaining to the performance of the head. This may facilitate failure analysis of heads that have been removed and/or replaced in drives.

In one embodiment, the bare drive is provided and/or sold without a head assembly. In another approach, the bare drive is provided in one package, and the head assembly is provided in a second package for assembly by a user. In yet another embodiment, the drive and head assembly are packaged together, whether assembled or not.

There have thus been described several embodiments of components that provide a new and useful approach to overcoming some of the most compelling issues currently facing consumers of tape-based products. For example, it is highly desirable to user and vendors of tape-based products to significantly reduce the cost of upgrading to the latest tape drive technology. Currently, in order for a customer to upgrade to the latest generation, all the drives in the library have to be repopulated with the latest drive hardware. This is fairly expensive especially since what usually changes from generation to generation is simply head technology, media, electronics, and microcode. It is also desirable for drives that fail in the field due to head problems to be fixed as quickly as possible. And lastly, it is also desirable to use a legacy head whenever the drive needs to read/write legacy media. The embodiments disclosed herein address these issues.

Embodiments with electronics integrated with the head assembly are particularly beneficial, due to the typically large number of channels on a head assembly. One benefit of having write drivers on the head assembly itself is that a lower bandwidth and/or lower current connection between the head assembly and tape drive may be used, as the tape drive need only send signaling data instead of write current data because the write current is now created on the head assembly. Another benefit is that a different encoding scheme using fewer conductors may be used to send the data to the head assembly.

Where amplifiers are present, an advantage of having the amplifiers of the read channels on the head assembly itself is that the characteristics of the read channel amplifiers are generally selected based on the type of transducers in the head. Thus, if it were desired to switch from a GMR head to a TMR head, having portions of the read channels, such as the amplifiers, on the head assembly itself would enable such type of interchange without exchanging hardware in the tape drive. Such interchange would not typically be possible in a standard tape drive due to the integration of such components on the circuit board of the tape drive.

Figure 6:
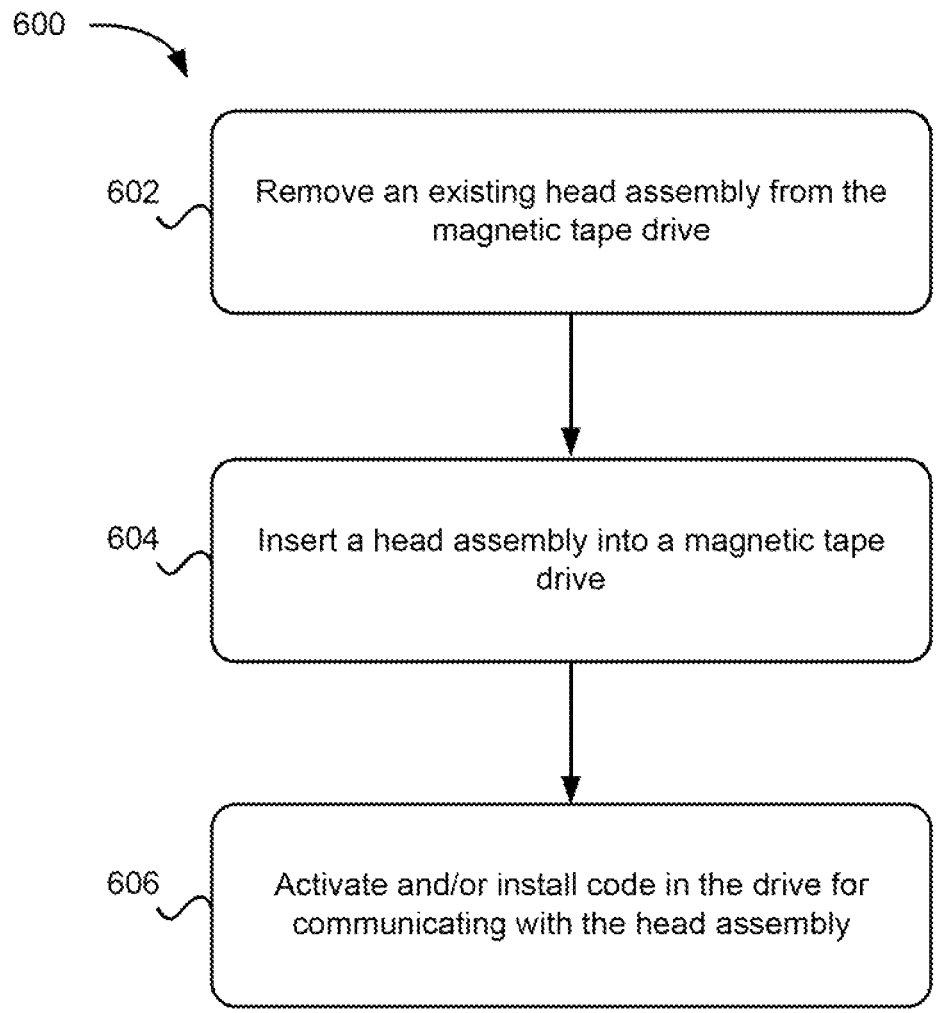
FIG. 6 is a flow diagram of a method according to one embodiment.

FIG. 6 depicts a method 600 according to one embodiment. In optional operation 602, an existing head assembly is removed from the magnetic tape drive. In operation 604, a head assembly is inserted into a magnetic tape drive, the head assembly having one or more modules containing a plurality magnetic transducers and one of amplifiers, bias circuitry write drives, write resistors, memory device, chip, etc. Upon accepting the head assembly, the drive is at least one of a functional drive, an updated drive, and a legacy drive. The drive may have at least one of a higher capacity and a higher data rate in operation with the now-installed head assembly than it had when operating with the head assembly that was removed.

In optional operation 606, code is activated and/or installed in the drive for communicating with the head assembly. Any method of activating and/or installing code known in the art may be used. The code may be retrieved from a memory chip on the head assembly; provided by way of a nonvolatile computer readable medium such as flash memory, an optical disc, etc.; downloaded and installed; already present on the drive and simply activated; etc. In some circumstances, such as replacing a head assembly with one of the same generation, operation 606 may not need to be performed. In addition, in some embodiments, operation 606 may be performed automatically by the drive when a new head is detected. This may include the drive automatically obtaining microcode or configuration information from electronic components located on the head itself.

Once the head assembly is plugged into the tape drive, the head assembly and/or tape drive may automatically set wrap angle using such technologies as the miniskirt head and/or automatically adjust for skew using such technologies as a skew actuator. The electronics relevant to that particular head may be mounted on a daughter board which has an easy latch/unlatch connector to the main board in the drive. If the drive is being upgraded to the latest generation or downgraded to a previous generation, microcode is loaded into the drive and the appropriate media is used.

Figure 7:
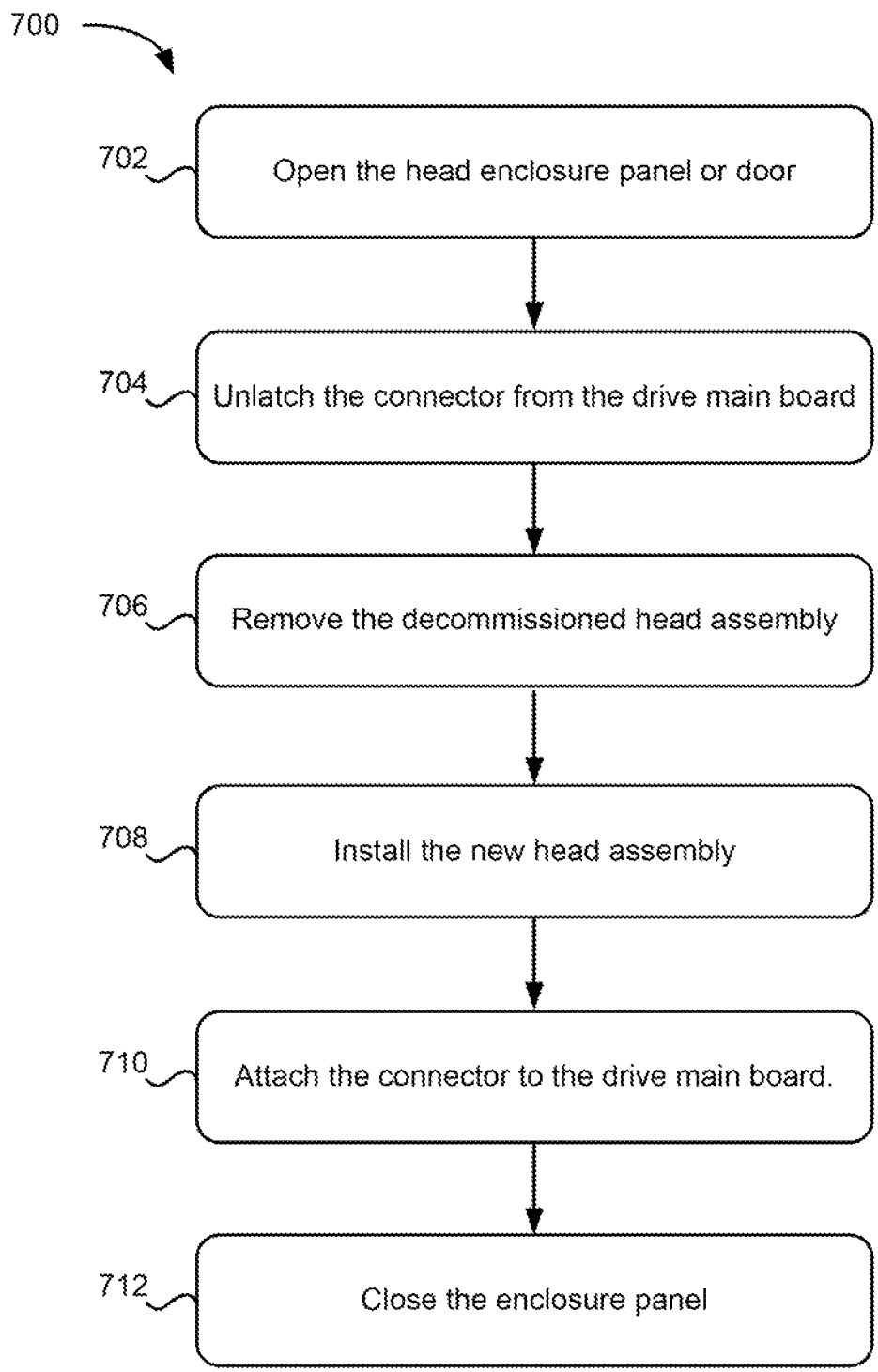
FIG. 7 is a flow diagram of a method according to one embodiment.

FIG. 7 depicts an illustrative method 700 that may be used to replace a failed head in the field, e.g., at a customer site. In operation 702, the head enclosure panel or door is opened. In operation 704, the connector is unlatched from the drive main board. In operation 706, the decommissioned head assembly is removed. In operation 708, the new head assembly is installed. In operation 710, the connector is attached to the drive main board. In operation 712, the enclosure panel is closed. Note that steps 704 and 706 may occur concurrently. Likewise steps 708 and 710 may also occur concurrently. Moreover, in this and any other embodiment, the order of the steps may be different than that presented herein.

Figure 8:
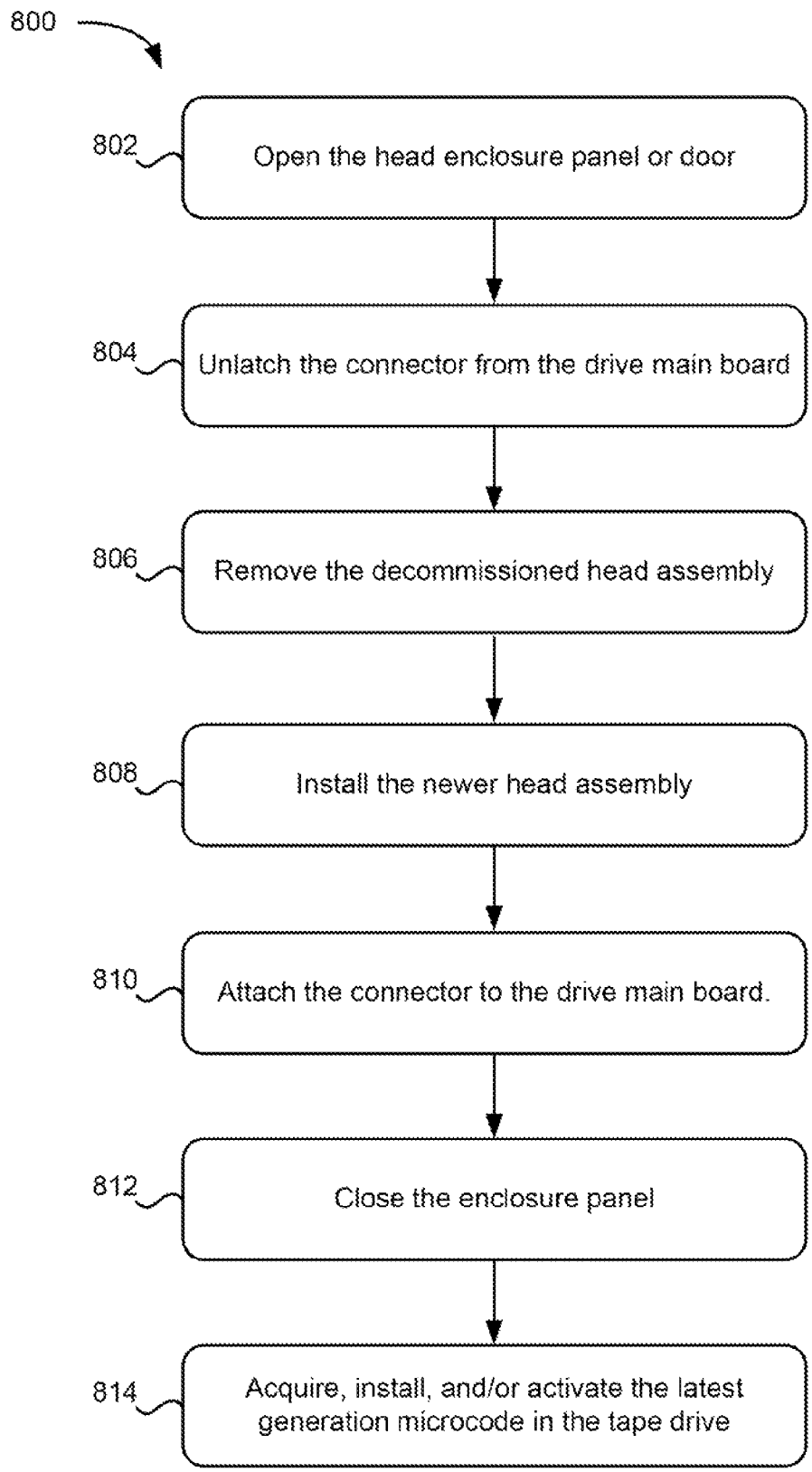
FIG. 8 is a flow diagram of a method according to one embodiment.

FIG. 8 depicts an illustrative method 800 for upgrading a tape drive to the latest generation. In operation 802, the head enclosure panel or door is opened. In operation 804, the connector is unlatched from the drive main board. In operation 806, the decommissioned head assembly is removed. In operation 808, the newer head assembly is installed. In operation 810, the connector is attached to the drive main board. In operation 812, the enclosure panel is closed. In operation 814, the latest generation microcode is acquired, installed, and/or activated in the tape drive. Note that steps 804 and 806 may occur concurrently. Likewise steps 808 and 810 may also occur concurrently.

Figure 9:
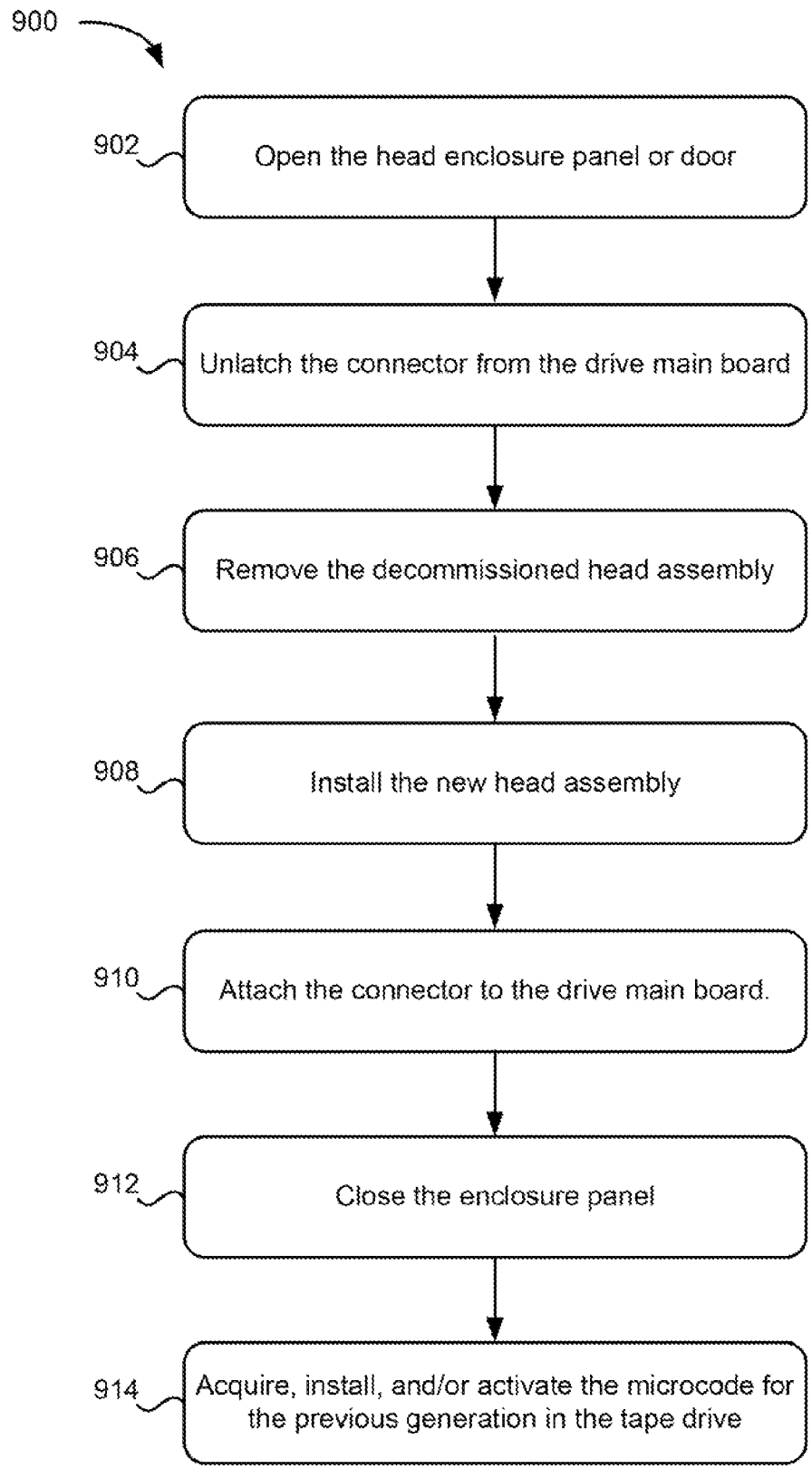
FIG. 9 is a flow diagram of a method according to one embodiment.

FIG. 9 depicts an illustrative method 900 for downgrading a tape drive to a previous generation, e.g., for backward compatibility. In operation 902, the head enclosure panel or door is opened. In operation 904, the connector is unlatched from the drive main board. In operation 906, the head assembly is removed. In operation 908, the previous-generation head assembly is installed. In operation 910, the connector is attached to the drive main board. In operation 912, the enclosure panel is closed. In operation 914, the appropriate microcode for the previous generation is acquired, installed, and/or activated in the tape drive. Note that steps 904 and 906 may occur concurrently. Likewise steps 908 and 910 may also occur concurrently.

Similar methodology may be used to replace a type of head, such as replacing an AMR head with a TMR head.

It will be appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A magnetic tape drive, comprising:
a head region for removably receiving a head assembly;
a mechanical interface to facilitate alignment of the head assembly when inserted in the head region, wherein the mechanical interface has one or more datums for aligning the head assembly relative to the head region, and wherein the datums accommodate up to and including at least 6 degrees of freedom associated with positioning a tape bearing surface and transducers of the head assembly;
a connector for detachably interfacing with the head assembly;
circuitry physically configured to operate with electronics on the head assembly, the electronics on the head assembly comprising at least one of amplifiers; bias circuitry; write drivers; write resistors; a memory device; and a chip with at least one of identification information about the head assembly, customization data, and firmware, wherein the circuitry of the tape drive is configured to use information from the memory device of the head assembly; and
an interface for enabling communication between the tape drive and a host to send and receive data therebetween, and for communicating the status of the tape drive to the host.

2. The magnetic tape drive of claim 1 wherein the one or more datums are adjustable.

3. The magnetic tape drive of claim 1, wherein performance of the drive is upgraded or downgraded when the head assembly is inserted therein.

4. The magnetic tape drive of claim 1, wherein the tape drive has a door for enabling insertion of the head assembly into the head region.

5. The magnetic tape drive of claim 1, further comprising electronics coupled to the connector, the electronics being for communicating with one or more of amplifiers, write drivers, and bias circuitry on the head assembly.

6. The magnetic tape drive of claim 1 wherein the head region is configured to removably receive a head assembly having at least 8 transducers.

7. The magnetic tape drive of claim 1 wherein the circuitry of the tape drive is configured to use information from the memory device of the head assembly for updating algorithms used to at least one of read and write data, move a tape, and servo a head of the head assembly.

8. The magnetic tape drive of claim 1 comprising logic configured to use information from the memory device of the head assembly for at least one of reading and writing data, moving a tape, and servoing a head of the head assembly.

9. The magnetic tape drive of claim 1 wherein the circuitry of the tape drive is configured to write data to the memory device of the head assembly.

10. The magnetic tape drive of claim 1 wherein the circuitry of the tape drive is configured to send signaling data to write drivers on the head assembly, wherein write current is created on the head assembly.

11. The magnetic tape drive of claim 1 wherein the circuitry of the tape drive is configured to receive and process amplified signals from read channels on the head assembly.

12. The magnetic tape drive of claim 1, further comprising the head assembly, the head assembly comprising:
  at least one module having one or more magnetic transducers for reading and/or writing to a magnetic tape;
  electronics electrically coupled to the transducers, the electronics comprising at least one of amplifiers; bias circuitry; write drivers; write resistors; a memory device; and a chip with at least one of identification information about the head assembly, customization data, and firmware; and
  a connector for detachably interfacing to the drive having the head region for receiving the head assembly.

13. A magnetic tape drive, comprising:
  a head region for removably receiving a head assembly;
  a mechanical interface to facilitate alignment of the head assembly when inserted in the head region, wherein the mechanical interface has one or more datums for aligning the head assembly relative to the head region, wherein the datums accommodate up to and including at least 6 degrees of freedom associated with positioning a tape bearing surface and transducers of the head assembly;
  a connector for detachably interfacing with the head assembly;
  circuitry configured to operate with electronics on the head assembly, the circuitry being configured to send signaling data to write drivers on the head assembly, wherein write current is created on the head assembly; and
  a skewing actuator for interfacing with the head assembly.

14. The magnetic tape drive of claim 13 wherein at least one of the one or more datums are adjustable.

15. The magnetic tape drive of claim 13 wherein the circuitry of the tape drive is configured to use information from a memory device of the head assembly for updating algorithms used to at least one of read and write data, move a tape, and servo a head of the head assembly.

16. The magnetic tape drive of claim 13 wherein the circuitry of the tape drive is configured to write data to a memory device of the head assembly.

17. The magnetic tape drive of claim 13 wherein the circuitry of the tape drive is configured to receive and process amplified signals from read channels on the head assembly.

* * * * *